United States Patent
Rouse (10) Patent No.: US 12,380,198 B2
(45) Date of Patent: Aug. 5, 2025

(54) SECURE HUMAN USER VERIFICATION FOR ELECTRONIC SYSTEMS

(71) Applicant: Tealium Inc., San Diego, CA (US)

(72) Inventor: Craig P. Rouse, Didcot (GB)

(73) Assignee: TEALIUM INC., San Diego, CA (US)

( * ) Notice: Subject to any disclaimer, the term of this patent is extended or adjusted under 35 U.S.C. 154(b) by 214 days.

(21) Appl. No.: 18/352,739

(22) Filed: Jul. 14, 2023

(65) Prior Publication Data

US 2024/0031178 A1 Jan. 25, 2024

Related U.S. Application Data

(60) Provisional application No. 63/368,827, filed on Jul. 19, 2022.

(51) Int. Cl.
| | |
|---|---|
| G06F 21/36 | (2013.01) |
| G06V 10/20 | (2022.01) |
| H04L 9/32 | (2006.01) |

(52) U.S. Cl.
CPC ............ G06F 21/36 (2013.01); G06V 10/255 (2022.01); H04L 9/3271 (2013.01)

(58) Field of Classification Search
None
See application file for complete search history.

(56) References Cited

U.S. PATENT DOCUMENTS

| | | | |
|---|---|---|---|
| 7,039,221 B1 * | 5/2006 | Tumey | G07C 9/37 |
| | | | 382/118 |
| 8,805,946 B1 | 8/2014 | Glommen et al. | |
| 8,843,827 B2 | 9/2014 | Koo et al. | |
| 8,904,278 B1 | 12/2014 | Anderson et al. | |
| 8,990,298 B1 | 3/2015 | Anderson | |
| 9,081,789 B2 | 7/2015 | Anderson | |
| 9,116,608 B2 | 8/2015 | Koo et al. | |
| 9,313,287 B2 | 4/2016 | Glommen et al. | |
| 9,357,023 B2 | 5/2016 | Glommen et al. | |
| 9,363,311 B1 | 6/2016 | McWilliams et al. | |
| 9,397,841 B2 | 7/2016 | Godse | |
| 9,479,609 B2 | 10/2016 | Anderson | |
| 9,537,964 B2 | 1/2017 | Glommen et al. | |
| 9,635,100 B2 | 4/2017 | McWilliams et al. | |
| 9,690,868 B2 | 6/2017 | Anderson | |
| 9,753,898 B1 | 9/2017 | Glommen et al. | |
| 9,769,252 B2 | 9/2017 | Glommen et al. | |
| 9,787,795 B2 | 10/2017 | Anderson | |
| 9,807,184 B1 | 10/2017 | Slovak et al. | |

(Continued)

*Primary Examiner* — Bradley W Holder (74) *Attorney, Agent, or Firm* — Knobbe Martens Olson & Bear LLP (57) ABSTRACT

Systems and methods are provided for a secure human user verification procedure that involves physical manipulation of a user device with respect to its environment. A challenge prompt may be presented for a user to provide challenge response data. A subsystem of an application running on the user device may be configured (e.g., using a machine learning model) to evaluate the challenge response data and determine whether the challenge response data includes the subject of the challenge. To ensure that the user is not providing pre-existing data in response to the challenge prompt, data items associated with the challenge response data may be evaluated to validate the challenge response data as being provided by a human user rather than automatically generated.

18 Claims, 6 Drawing Sheets

(56) References Cited

U.S. PATENT DOCUMENTS

| | | |
|---|---|---|
| 10,003,639 B2 | 6/2018 | McWilliams et al. |
| 10,078,708 B2 | 9/2018 | Slovak |
| 10,110,690 B2 | 10/2018 | Slovak et al. |
| 10,133,709 B2 | 11/2018 | Glommen et al. |
| 10,187,456 B2 | 1/2019 | Glommen et al. |
| 10,241,986 B2 | 3/2019 | Anderson et al. |
| 10,268,657 B2 | 4/2019 | Kirk et al. |
| 10,282,383 B2 | 5/2019 | Anderson |
| 10,327,018 B2 | 6/2019 | Anderson et al. |
| 10,356,191 B2 | 7/2019 | Glommen et al. |
| 10,432,701 B2 | 10/2019 | McWilliams et al. |
| 10,476,977 B2 | 11/2019 | Slovak et al. |
| 10,484,498 B2 | 11/2019 | Anderson |
| 10,558,728 B2 | 2/2020 | Slovak |
| 10,635,853 B2 | 4/2020 | Glommen et al. |
| 10,817,664 B2 | 10/2020 | Anderson et al. |
| 10,831,852 B2 | 11/2020 | Anderson |
| 10,832,485 B1 * | 11/2020 | Mantri .................... G06F 3/017 |
| 10,834,175 B2 | 11/2020 | Glommen et al. |
| 10,834,216 B2 | 11/2020 | Slovak et al. |
| 10,834,225 B2 | 11/2020 | Anderson |
| 10,951,687 B2 | 3/2021 | McWilliams et al. |
| 10,990,641 B2 | 4/2021 | Kirk et al. |
| 11,089,344 B2 | 8/2021 | Anderson et al. |
| 11,095,735 B2 | 8/2021 | Gavin et al. |
| 11,140,233 B2 | 10/2021 | Glommen et al. |
| 11,146,656 B2 | 10/2021 | Rouse et al. |
| 11,281,845 B2 | 3/2022 | Glommen et al. |
| 11,310,327 B2 | 4/2022 | Slovak et al. |
| 11,314,815 B2 | 4/2022 | Slovak |
| 11,347,824 B2 | 5/2022 | Anderson |
| 11,405,670 B2 | 8/2022 | Anderson et al. |
| 11,425,190 B2 | 8/2022 | McWilliams et al. |
| 11,483,378 B2 | 10/2022 | Glommen et al. |
| 11,537,683 B2 | 12/2022 | Kirk et al. |
| 11,570,273 B2 | 1/2023 | Anderson |
| 11,593,554 B2 | 2/2023 | Anderson et al. |
| 11,622,019 B2 | 4/2023 | Slovak et al. |
| 11,622,026 B2 | 4/2023 | Rouse et al. |
| 11,671,510 B2 | 6/2023 | Gavin et al. |
| 11,695,845 B2 | 7/2023 | Glommen et al. |
| 11,734,377 B2 | 8/2023 | Anderson |
| 2013/0339245 A1 | 12/2013 | Epstein |
| 2015/0007289 A1 * | 1/2015 | Godse .................. H04L 9/3271 726/7 |
| 2018/0310171 A1 | 10/2018 | Whitaker et al. |
| 2020/0042681 A1 * | 2/2020 | Benkreira ............. H04L 63/102 |
| 2022/0318309 A1 | 10/2022 | Slovak |
| 2023/0056362 A1 | 2/2023 | Anderson et al. |
| 2023/0066660 A1 | 3/2023 | Batanov, III et al. |
| 2023/0117702 A1 | 4/2023 | McWilliams et al. |
| 2023/0156073 A1 | 5/2023 | Glommen et al. |
| 2023/0205835 A1 | 6/2023 | Kirk et al. |

\* cited by examiner

SECURE HUMAN USER VERIFICATION FOR ELECTRONIC SYSTEMS

RELATED APPLICATIONS

Any and all applications for which a domestic priority claim is identified in the Application Data Sheet of the present application are hereby incorporated by reference under 37 CFR 1.57.

BACKGROUND

A computing system may use various techniques to ensure that a genuine human user, rather than an automatic system, is interacting with the computing system.

SUMMARY

In some aspects, the techniques described herein relate to a computing system including: a display device; a camera device configured to generate image data; computer-readable memory storing an image recognition model configured to recognize images of a plurality of challenge subjects; and one or more processors programmed by executable instructions to at least: determine to verify whether a user, of an application configured to be executed by the one or more processors, is a human user; select a challenge subject from the plurality of challenge subjects, wherein an image of the challenge subject is to be provided in response to a challenge prompt; present the challenge prompt using the display device; receive, in response to the challenge prompt, the image data and challenge context data; determine, using the image recognition model, that at least a portion of the image data represents the image; determine that the challenge context data fails to satisfy a response validation criterion; and in response to determining that the challenge context data fails to satisfy the response validation criterion, prevent an operation of the application.

In some aspects, the techniques described herein relate to a computing system, wherein the image recognition model includes a neural network trained to recognize the plurality of challenge subjects.

In some aspects, the techniques described herein relate to a computing system, wherein the one or more processors are further programmed by the executable instructions to generate a pseudo-random number, wherein the challenge subject is selected using the pseudo-random number.

In some aspects, the techniques described herein relate to a computing system, wherein the plurality of challenge subjects include objects expected to be within an environment of the user.

In some aspects, the techniques described herein relate to a computing system, wherein the image data and challenge context data are not transmitted to a second computing system.

In some aspects, the techniques described herein relate to a computing system, wherein to determine that the challenge context data fails to satisfy the response validation criterion, the one or more processors are programmed by the executable instructions to determine that the challenge context data indicates the image data was generated using another camera device different from the camera device, wherein the challenge context data represents a source of the image data.

In some aspects, the techniques described herein relate to a computing system, further including a movement sensor, wherein to determine that the challenge context data fails to satisfy the response validation criterion, the one or more processors are programmed by the executable instructions to determine that movement detected by the movement sensor is not indicative of human use of the camera device to generate the image data, wherein the challenge context data represents the movement detected by the movement sensor.

In some aspects, the techniques described herein relate to a computing system, wherein to determine that the challenge context data fails to satisfy the response validation criterion, the one or more processors are programmed by the executable instructions to determine that the image data was generated at a first geographic location different from a second geographic location, wherein the challenge context data represents the first geographic location.

In some aspects, the techniques described herein relate to a computing system, wherein to determine that the challenge context data fails to satisfy the response validation criterion, the one or more processors are programmed by the executable instructions to determine that the image data was generated prior to presentation of the challenge prompt, wherein the challenge context data represents a time at which the image data was generated.

In some aspects, the techniques described herein relate to a computing system, wherein to determine that the challenge context data fails to satisfy the response validation criterion, the one or more processors are programmed by the executable instructions to determine that the image data was generated less than a threshold period of time after presentation of the challenge prompt, wherein the challenge context data represents a time at which the image data was generated.

In some aspects, the techniques described herein relate to a computing system, wherein to determine that the challenge context data fails to satisfy the response validation criterion, the one or more processors are programmed by the executable instructions to determine that the image data was generated more than a threshold period of time after presentation of the challenge prompt, wherein the challenge context data represents a time at which the image data was generated.

In some aspects, the techniques described herein relate to a computing system, wherein the one or more processors are further programmed to: select a second challenge subject from the plurality of challenge subjects, wherein a second image of the second challenge subject is to be provided in response to a second challenge prompt; present the second challenge prompt using the display device; receive, in response to the second challenge prompt: second image data generated by the camera device; and second challenge context data; determine, using the image recognition model, that at least a portion of the second image data represents the second image; determine that the second challenge context data satisfies the response validation criterion; and permit the operation of the application.

In some aspects, the techniques described herein relate to a computing system, wherein the one or more processors are further programmed to: select a second challenge subject from the plurality of challenge subjects, wherein a second image of the second challenge subject is to be provided in response to a second challenge prompt; present the second challenge prompt using the display device; receive, in response to the second challenge prompt, second image data generated by the camera device; determine, using the image recognition model, that the second image data fails to represent the second image; and in response to determining that the second image data fails to represent the second image, prevent the operation of the application.

In some aspects, the techniques described herein relate to a computer-implemented method including: under control of a computing system including one or more processors configured to execute specific instructions: determining that a human user verification procedure is to be performed; selecting a challenge subject from a plurality of challenge subjects, wherein an image of the challenge subject is to be provided in response to a challenge prompt; presenting the challenge prompt using a display device of the computing system; receiving, in response to the challenge prompt, image data and challenge context data; generating subject verification data representing whether the image data includes a representation of the image; generating response validation data representing whether the challenge context data satisfies a response validation criterion; and generating human user verification data based at least partly on the subject verification data and the response validation data.

In some aspects, the techniques described herein relate to a computer-implemented method, wherein determining that the human user verification procedure is to be performed is based on a request received from a server computing device over a network, and wherein neither the image data nor the challenge context data are transmitted by the computing system to the server computing device.

In some aspects, the techniques described herein relate to a computer-implemented method, further including generating a pseudo-random number, wherein the challenge subject is selected using the pseudo-random number.

In some aspects, the techniques described herein relate to a computer-implemented method, further including determining that the challenge context data fails to satisfy the response validation criterion, wherein the human user verification data represents a failure to verify that a human user responded to the challenge prompt.

In some aspects, the techniques described herein relate to a computer-implemented method, wherein determining that the challenge context data fails to satisfy the response validation criterion includes determining that the image data was generated using a camera device external to the computing system, and wherein the challenge context data represents a source of the image data.

In some aspects, the techniques described herein relate to a computer-implemented method, wherein determining that the challenge context data fails to satisfy the response validation criterion includes determining that movement of the computing system is not indicative of human use of a camera device of the computing system to generate the image data, wherein the challenge context data represents movement of the computing system.

In some aspects, the techniques described herein relate to a computer-implemented method, wherein determining that the challenge context data fails to satisfy the response validation criterion includes determining that the image data was generated at first geographic location different from a second geographic location, wherein the challenge context data represents the first geographic location.

In some aspects, the techniques described herein relate to a computer-implemented method, wherein determining that the challenge context data fails to satisfy the response validation criterion includes determining that the image data was generated prior to presentation of the challenge prompt, wherein the challenge context data represents a time at which the image data was generated.

In some aspects, the techniques described herein relate to a computer-implemented method, wherein determining that the challenge context data fails to satisfy the response validation criterion includes determining that the image data was generated less than a threshold period of time after presentation of the challenge prompt, wherein the challenge context data represents a time at which the image data was generated.

In some aspects, the techniques described herein relate to a computer-implemented method, wherein determining that the challenge context data fails to satisfy the response validation criterion includes determining that the image data was generated more than a threshold period of time after presentation of the challenge prompt, wherein the challenge context data represents a time at which the image data was generated.

In some aspects, the techniques described herein relate to a computer-implemented method, further including generating a notification to a contact center agent to perform an additional human user verification procedure.

In some aspects, the techniques described herein relate to a computer-implemented method, further including, in response to determining that the challenge context data fails to satisfy the response validation criterion, quarantining data associated with a non-genuine human user.

In some aspects, the techniques described herein relate to a computer-implemented method, further including, in response to determining that the challenge context data fails to satisfy the response validation criterion, generating alternative data for presentation to a non-genuine human user.

In some aspects, the techniques described herein relate to non-transitory physical computer storage including computer-executable instructions stored thereon that, when executed by one or more processors of a computing system, are configured to implement a process including: determining that a human user verification procedure is to be performed; selecting a challenge subject from a plurality of challenge subjects, wherein an image of the challenge subject is to be provided in response to a challenge prompt; presenting the challenge prompt using a display device of the computing system; receiving, in response to the challenge prompt, image data and challenge context data; generating subject verification data representing whether the image data includes a representation of the image; generating response validation data representing whether the challenge context data satisfies a response validation criterion; and generating human user verification data based at least partly on the subject verification data and the response validation data.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Computing systems, such as providers of network-based content for obtaining goods and services, face the problem of automated systems and organizations configured to simulate genuine human user activity. Such simulated activity can be damaging to the content providers, such as when the simulated activity is used to provide false input, make fraudulent purchases, or carry out other undesirable activities. A solution to this problem involves use of a Completely Automated Public Turing Test to Tell Computers and Humans Apart (CAPTCHA).

Use of CAPTCHAs to verify human users has several drawbacks. For example, in an attempt to hinder the ability of computer vision (CV) and machine learning (ML) algorithms to decipher a presented alphanumeric string that a user is being prompted to enter, CAPTCHAs often distort presentation of the alphanumeric string to such a degree that it is difficult for genuine human users to recognize. As another example, prompts for CAPTCHAs involving selection of images or tiles can be ambiguous. In these and other cases, it can take several attempts for a genuine human user to solve a CAPTCHA, leading to frustration and risking abandonment of a session with the content provider.

Advanced machine learning algorithms have made solving CAPTCHAs with automated systems significantly less difficult than previously assumed. In some cases, automated systems using such machine learning algorithms are able to correctly decipher and respond to CAPTCHAs correctly more often than genuine human users. As a result, CAPTCHAs may be more likely to prevent genuine human users from accessing content than automatic systems. In addition to automated CAPTCHA solving methods, some organizations offer teams of humans to solve CAPTCHAs and return responses.

Some aspects of the present disclosure address some or all of the issues noted above, among others, through a secure human user verification procedure that involves a challenge associated with physical manipulation of a user device with respect to its environment. In some embodiments, the challenge may be for the user to use the user device to take a photograph of a selected object in the environment of the user device. The user device may be a mobile computing device, such as a smart phone or a tablet, with an integrated camera. A user may be initiating or engaging in an application session, such as a session using application software executing on the user device (e.g., to browse and potentially purchase items). The application software may determine to execute a secure human user verification procedure to verify that the user is a genuine human user. The user may then be prompted (e.g., using a visual overlay in the application interface) to take a picture of an object that the application randomly or pseudo-randomly selects from a list of objects. For example, the list may include objects commonly found in a typical usage environment (e.g., lamp, doorknob, chair, etc.). The prompt may include user interface controls for controlling the operation of the built-in camera of the user device to take the required picture. A subsystem of the application may be configured (e.g., using a machine learning model trained to recognize the objects that may be the subject of the challenge) to evaluate the picture taken by the user and determine whether the picture includes the object that the user was prompted to capture. If the user has successfully captured an image of the selected object, then the user may be considered to have passed the human user verification procedure and may be permitted to begin or continue the application session or otherwise perform a particular application operation. If the result of the secure human user verification procedure is that there is likely not a genuine human user, then an application operation may be prevented.

Advantageously, the response to the human user verification challenge is generated using a user device, and the response may be processed on the same user device to verify that the user is a genuine human user. By presenting the challenge prompt and processing the response on the same device (e.g., without transmitting the response over a network to another device for processing), security risks such as "man in the middle" attacks can be mitigated or eliminated.

Additional aspects of the present disclosure relate to secure methods of validating the user's response to a challenge prompt during a human user verification procedure. To ensure that the user is not providing a pre-existing image in response to a prompt or otherwise providing a response without capturing an image from the environment using a camera of the user device, challenge context data such as image metadata may be evaluated. In some embodiments, the metadata may be or include Exchangeable Image File (EXIF) data that is automatically generated by a digital camera when the camera captures an image and generates a file. For example, a photo that has just been taken with a real camera device will include metadata representing: the manufacturer and model of the camera device, a timestamp of image capture, global positioning system (GPS) coordinates of the location of the camera device when the photograph was taken, exposure properties of the camera device when the photograph was taken, other properties, or some combination thereof. The metadata value or values may be evaluated to determine whether they correspond to the value or values expected to be observed. If the values do not correspond to values expected to be observed, then the user may not be confirmed as a genuine human user even if the photo provided in response to the prompt includes the object that the user was prompted to capture in the photo. For example, the user may not be validated as a human user if the GPS coordinates in the metadata are significantly different than the GPS coordinates of the user device, the timestamp of photograph capture is before the user was prompted to take the photograph, or the manufacturer/model of the camera device do not match the camera that is integrated with the user device. Advantageously, this additional validation of the user's response can help to ensure that the response is not selected from a library of images, provided by a remote user as part of a CAPTCHA solver service, or otherwise not indicative of a genuine human user of the application.

Further aspects of the present disclosure relate to alternative methods of human user verification, such as accessible methods that may be used with users who have impairments that would make photo-based human user verification procedures difficult or impossible. For example, users with visual impairments may not be able to adequately respond to prompts to take photos of objects in the environment. To address such limitations, an alternative audio-based challenge may be presented. In some embodiments, an audio-based challenge may include prompting a user (e.g., by audio presentation) to speak a particular phrase that is randomly or pseudo-randomly selected from a list or generated using a generative model. Like the photograph-based user verification process, the users spoken response may be transcribed using a automatic speech recognition (ASR) subsystem on the user device itself, and then evaluated to determine whether the response matches the phrase that the user was prompted to speak.

Figure 1:
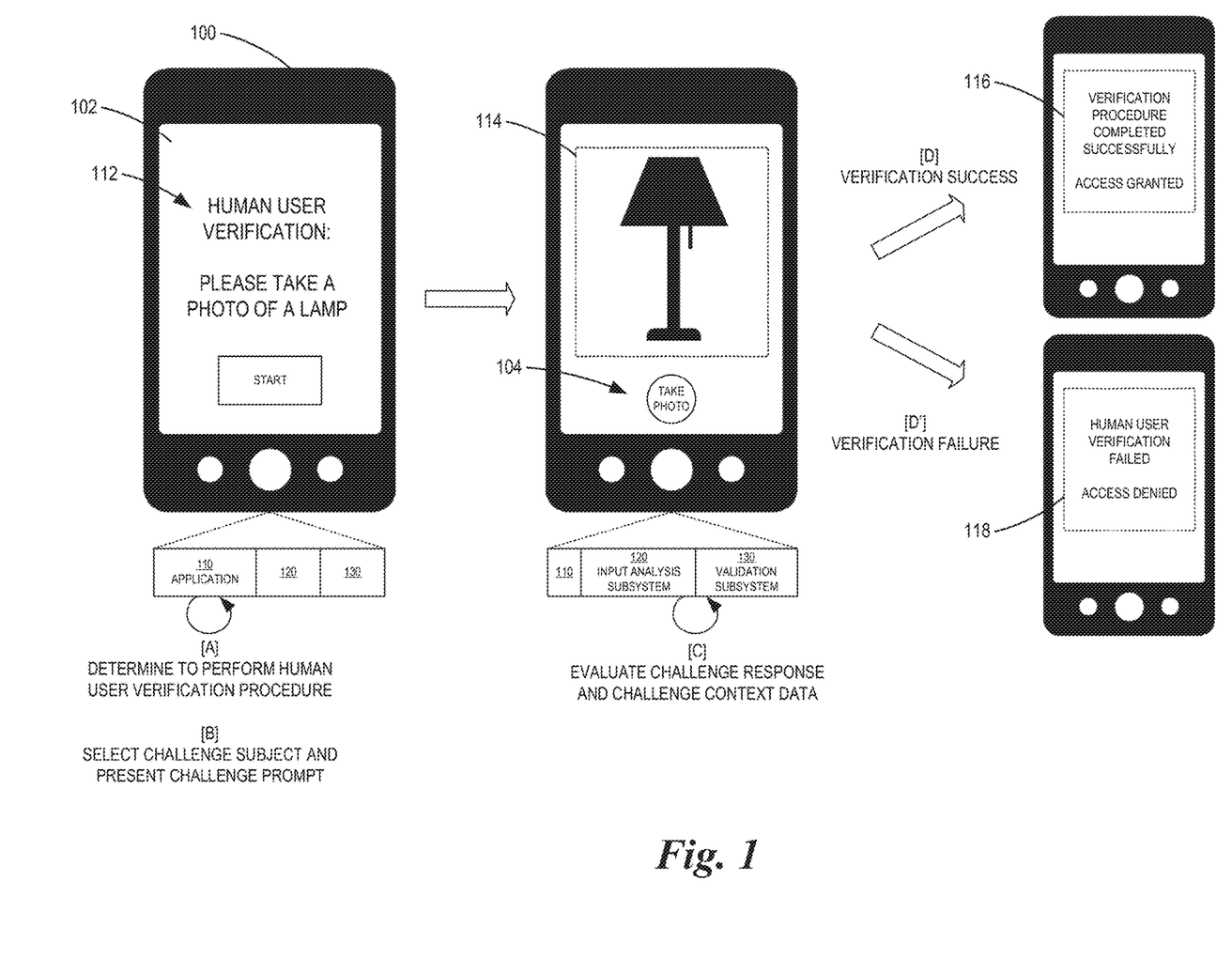
FIG. 1 is a diagram of illustrative operations and interactions during a human user verification procedure according to some embodiments.

Various aspects of the disclosure will now be described with regard to certain examples and embodiments, which are intended to illustrate but not limit the disclosure. Although the examples and embodiments described herein will focus, for the purpose of illustration, on specific computing devices, input/output components, and algorithms, one of skill in the art will appreciate the examples are illustrative only, and are not intended to be limiting. In addition, any feature, process, device, or component of any embodiment described or illustrated in this specification can be used by itself, or with or instead of any other feature, process, device, or component of any other embodiment described or illustrated in this specification Example Computing Environment FIG. 1 shows example operations and interactions during a human user verification procedure. Advantageously, the human user verification procedure may be performed on the same user system 100 that the user is using to access content, engage in an application session, or otherwise perform a desired application operation. The user system 100 may also be referred to as a user computing system, computing system, or user device.

The user system 100 can be or include any form of computing device with memory and one or more processors configured to execute programmatic instructions. In some embodiments the user system 100 may be a smartphone, tablet, wearable device (e.g., smart watch, smart eyewear), media player, gaming device, desktop computer, laptop computer, or the like. An application 110, such as a browser or other application software to present content and interact with a network-accessible system, may be installed on and executed by the user system 100.

In some embodiments, the content may be or include files that may be accessed over the network, such as web pages, documents (such as pdf documents), videos, images, text, combinations of the same, or the like. For example, the application 110 may communicate with a network-accessible server of a content site, such as an online marketplace or content provider. The application 110 may present content that is retrieved from the content site over a network. In some embodiments, the application 110 may also or alternatively present content that is stored locally within the user system 100.

At [A], the application 110 may determine that a human user verification procedure is to be performed. In some embodiments, the application 110 may make the determination based on activities on the user system 100. For example, when a particular application event occurs, such as a request for a particular content item, initiation of a purchase, or the like, the application 110 may be configured to trigger a human user verification procedure. In some embodiments, the application 110 may make the determination based on a communication received over a network. For example, when a particular event occurs, such as a request for a particular content item, initiation of a purchase, or the like, a network-accessible server may request the application 110 to execute the human user verification procedure. In some embodiments, the user-perceived beginning of the human user verification procedure may be presentation of a prompt, or "challenge," to provide an appropriate response.

The application 110 may select a challenge subject and present a challenge prompt at [B]. A display device 102 of the user system 100, such as a screen, may present the challenge 112. In the illustrated example, the challenge 112 is a prompt to use the user system 100 to take a photograph of an object that is expected to be within the user's environment or otherwise near the user's location (e.g., a lamp). The challenge 112 further specifies that the photograph is to be taken within a threshold period of time (e.g., 2 minutes). In this example, the lamp is the subject of the challenge 112. As described in greater detail below, the specific object that is the subject of the challenge 112 may be randomly selected or pseudo-randomly selected from a set of objects or other challenge subjects that the application 110 is configured to recognize in photographs.

At [C], an input analysis subsystem 120 and a validation subsystem 130 may evaluate the response to the challenge. In some embodiments, the input analysis subsystem 120 or validation subsystem 130 may be subsystems of the application 110. For example, the functionality of the input analysis subsystem 120 and validation subsystem 130 may be provided by executable code modules that are part of the application 110. In some embodiments, the input analysis subsystem 120 or validation subsystem 130 may be subsystems of an operating system of the user system 100 or an application that is different from the application 110. For example, the functionality of the input analysis subsystem 120 and validation subsystem 130 may be provided by executable code modules that are separate from the executable code of the application 110, such as modules or applications previously installed on the user system 100, modules or applications obtained from a network-accessible server in connection with an application session, or the like.

As shown, the user may use a camera device of the user system 100 to capture an image 114 of the subject of the challenge 112. The image 114 may be evaluated by the input analysis subsystem 120 to determine whether the image 114 includes (or is likely to include) the challenge subject. The response to the challenge may be further validated by the validation subsystem 130 to ensure (or increase the likelihood) that the response is being provided by a user operating the user system 100 in response to the challenge 112. For example, the validation subsystem 130 may determine whether image 114 was generated at a time after prompting of the challenge 112, whether the image 114 was generated by the camera device of the user system 100, whether physical movements of the user system 100 are indicative of operation by a human user to photograph the subject of the challenge 112, or whether other indicia of genuine human use are present.

At [D], if the response includes the subject of the challenge and is validated as likely to come from a genuine human user in response to the challenge, then the current user may be verified as a human user and the application 110 may present output indicating the successful verification 116 or otherwise proceed with operation. However, if at [D'] the response does not include the subject of the challenge or is not validated as likely to come from a genuine human user in response to the challenge, then the current user may not be verified as a human user and the application 110 may present output indicating the unsuccessful verification 118.

The example challenge, response, and processing operations illustrated in FIG. 1 are illustrative only and are not intended to be limiting, required, or exhaustive. In some embodiments, additional, fewer, or alternative operations may be performed during execution of a human user verification procedure. For example, a challenge may be primarily audio-based for visually-impaired users. The subject of such a challenge may be a word, phrase, or sentence that the user is to speak. The prompt of the challenge may include the utterance to be made (e.g., "Say 'The quick brown fox jumps over the lazy dog'"), or the prompt may refer to the utterance to be made (e.g., "Please speak your full home address"). Input analysis by the input analysis subsystem 120 may include performance of ASR on audio data captured by a microphone of the user system 100, and comparison of the resulting text data with text data for the subject of the challenge. Validation of the input by the validation subsystem 130 may be performed in a manner that is similar to the image-based challenge above.

Example Human User Verification Procedure

Figure 2:
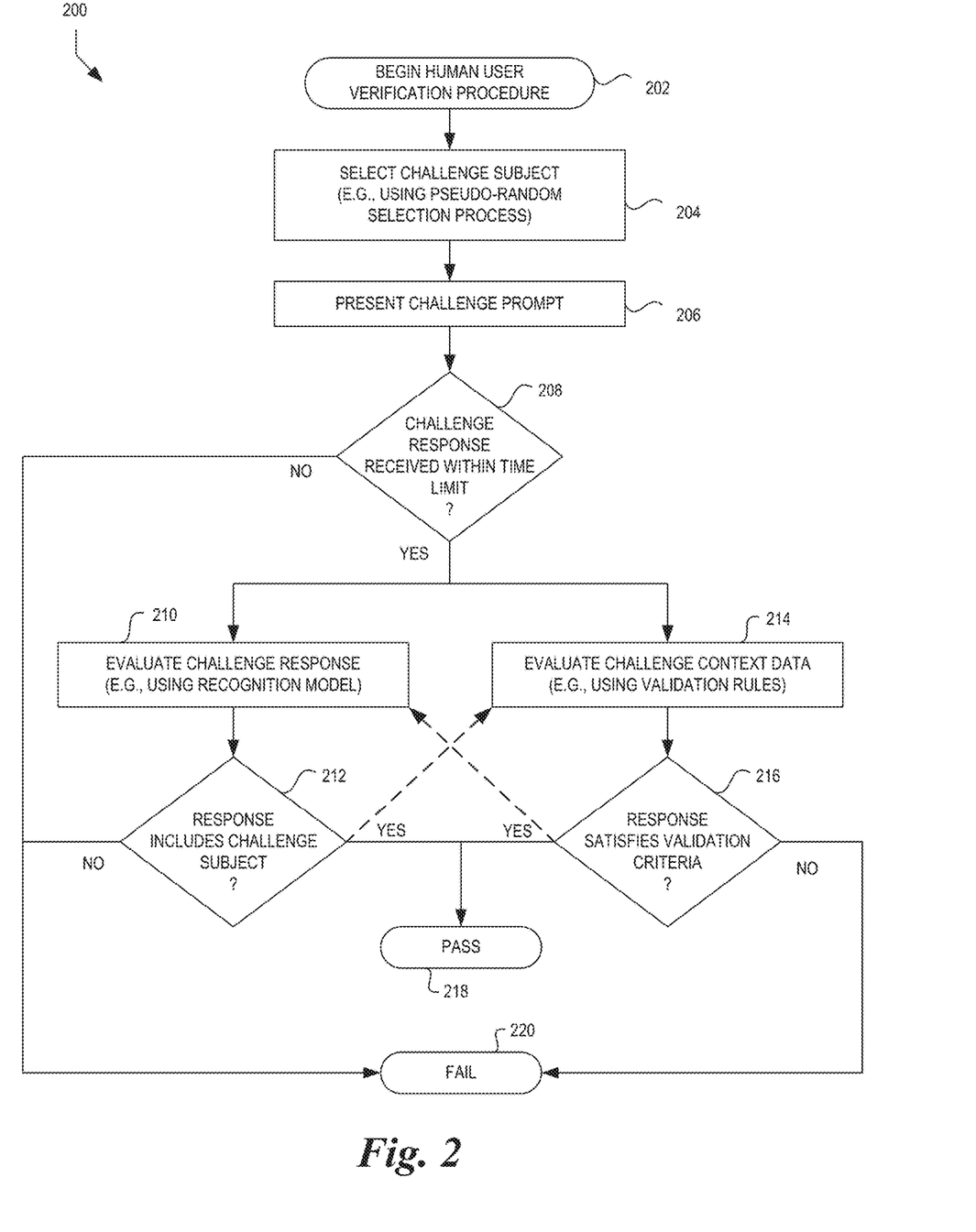
FIG. 2 is a flow diagram of an illustrative routine for performing human user verification according to some embodiments.

FIG. 2 illustrates an example routine 200 as a computer-implemented method for executing a human user verification procedure. Routine 200 will be described with further reference to the example interactions illustrated in FIG. 3.

Routine 200 begins at block 202. In some embodiments, routine 200 may begin in response to an event, such as when a particular user interaction occurs, when use of an application 110 is not consistent with use by a genuine human user, when a request is received from a network-accessible server, or when application 110 otherwise determines to perform a human use verification procedure. When routine 200 begins, executable instructions may be loaded to or otherwise accessed in computer readable memory and executed by one or more computer processors, such as the memory and processors of the example user system 100 illustrated in FIG. 5 and described in greater detail below.

At block 204, the application 110 or some other application, module, or component executed by the user system 100 can select an item that the user is to be prompted to provide for verification. If the human user verification procedure is to include a photographic challenge in which a user is prompted to take a photograph of an object, the application 110 may access a list of objects from which to select an object for the user to photograph. In some embodiments, the object may be a challenge subject randomly or pseudo-randomly selected from a plurality of challenge subjects. For example, a pseudo-random number generator (PRNG) may be used to generate a pseudo-random number that can be used to select an object from the list (e.g., based on a position in the list that corresponds to the pseudo-random number is some way).

In some embodiments, other types of challenges may be generated such as a challenge to speak a particular phrase. In this case, the challenge subject may be selected from a plurality of challenge subject a manner similar to selection of an object to be photographed as described above. For example, a PRNG may be used to generate a pseudo-random number that can be used to select a phrase from a list of phrases.

At block 206, the application 110 or some other application, module, or component executed by the user system 100 can generate a prompt for the user perform the challenge and provide input. In some embodiments, as shown in FIG. 1, the challenge 112 may be a prompt to take a photograph of a particular object, such as a lamp in the illustrated example.

At decision block 208, the application 110 or some other application, module, or component executed by the user system 100 can determine whether input in response to the prompt has been received. Such input may be referred to as challenge response data. In some embodiments, as shown in FIG. 1, an input interface 104 may be presented that the user is to use to provide the prompted input. For example, if the prompted input is a photograph, then the input interface 104 may provide user controls to operate a camera device of the user system 100. The application 110 can then determine whether a photograph has been received. As another example, if the prompted input is an utterance, the input interface 104 may present an indication that a microphone device of the user system 100 is active and awaiting input. The application 110 can then determine whether an utterance has been received. If challenge response data has been received, the routine 200 may proceed to block 210 or block 214. Otherwise, if no challenge response data has been received, the routine 200 may proceed to block 220, where a failure result is returned.

In some embodiments, challenge response data may be required to be received within a maximum period of time. For example, the challenge response data may be required to be received no more than about 120 seconds from when the prompt for the challenge 112 is presented, no more than about 90 seconds from when the prompt is presented, or no more than about 60 seconds from when the prompt is presented. If the maximum period of time has passed since presentation of the prompt without receipt of a user input, the application 110 may determine at decision block 208 that the challenge response data has not been received.

At block 210, an input analysis subsystem 120 or some other application, module, or component of the user system 100 can evaluate the challenge response data.

Figure 3:
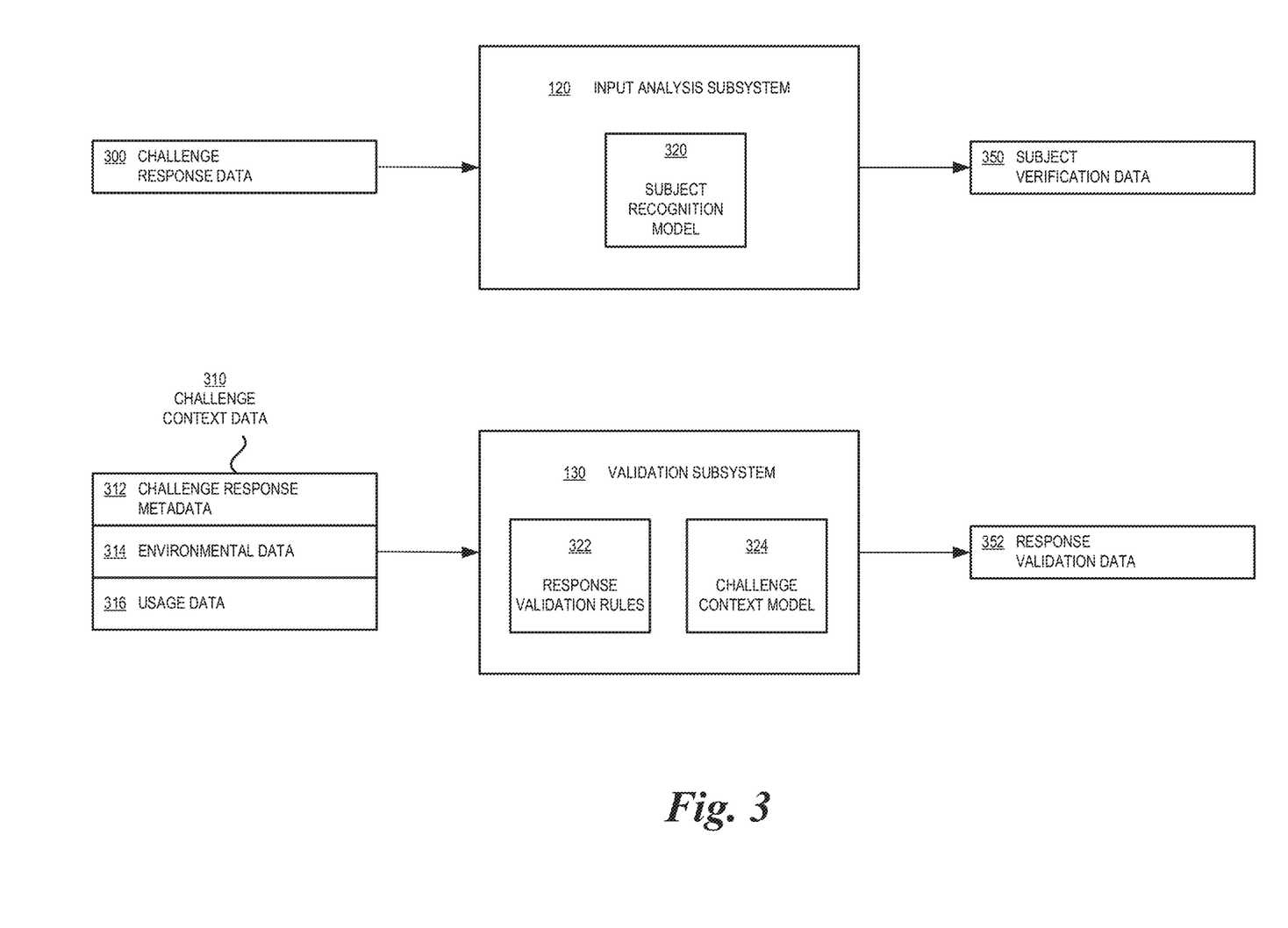
FIG. 3 is a diagram of using illustrative subsystems of a user system to evaluate aspects of a human user verification procedure according to some embodiments.

FIG. 3 shows an example input analysis subsystem 120 configured to evaluate challenge response data 300 and generate subject verification data 350. In the illustrated example, the challenge response data 300 may be evaluated using a machine learning model, such as a subject recognition model 320. For example, if the challenge response data 300 is a photograph, the model 320 may be a neural-network-based image recognition model, such as a convolutional neural network (CNN), trained to recognize in images each of the plurality of challenge subjects that may be selected in a human user verification procedure. As another example, if the challenge response data 300 is audio data regarding an utterance, the model 320 may be or include an acoustic model, language model, or other automatic speech recognition (ASR) model.

In some embodiments, subject verification data 350 may be classification output. For example, the model 320 may be trained to recognize each of a set of objects in image input, such as lamp, chair, doorknob, etc. If any of the objects is recognized, the subject verification data 350 may indicate recognition of the object(s) in the image input.

At decision block 212 of the routine 200, the input analysis subsystem 120 or some other application, module, or component executed by the user system 100 can determine whether the challenge response data satisfies the challenge. In some embodiments, if the challenge response data is image data that is evaluated using a machine learning model as described above, the determination may be based on whether a classification or other output of the input analysis subsystem 120 indicates the challenge response data is an image that includes the object that the user was prompted to photograph. If the image includes the challenge subject, the routine 200 may proceed to block 218 to indicate that the user has passed the human user verification procedure, or the routine 200 may proceed to block 214 (as illustrated using dashed lines) for validation of the challenge response if block 214 was not completed previously or in parallel. Otherwise, if the image does not include the challenge subject, the routine 200 may proceed to block 220 to indicate that the human user verification procedure has failed to verify a genuine human user.

At block 214, a validation subsystem 130 or some other application, module, or component of the user system 100 can evaluate challenge context data associated with the challenge response data.

FIG. 3 shows an example validation subsystem 130 configured to evaluate challenge context data 310 associated with the challenge response, and generate response validation data 352. In the illustrated example, the challenge context data 310 may include one or more of challenge response metadata 312, environmental data 314, usage data 316, other data, or some combination thereof.

In some embodiments, the challenge response metadata 312 may include metadata generated in connection with the challenge response data 300, such as EXIF data if the challenge response data 300 is image data. For example, an image that has just been taken with a real camera device may include metadata representing: the manufacturer and model of the camera device; a timestamp of image capture; GPS coordinates of the location of the camera device when the photograph was taken; exposure properties of the camera device when the photograph was taken; or the like. For added security, the challenge response metadata 312 in some embodiments may have been embedded into the challenge response data 300 as an encrypted time-based watermark that would not be reproducible outside of the application 110 or user system 100.

In some embodiments, the environmental data 314 may include data about the user system 100 or the environment in which the user system 100 is being used. For example, environmental data 314 may include data representing: the manufacturer and model of the user system 100 or individual components thereof such as a camera; a timestamp of the current data/time as maintained by the user system 100; GPS coordinates of the location of the user system 100; ambient temperature; ambient light; ambient sound; proximity; fluid; humidity; strain; or the like. In some embodiments, the environmental data 314 or portions thereof may be generated by one or more sensors.

In some embodiments, the usage data 316 may include data about user interactions with the user system 100. For example, usage data 316 may include data representing: physical movements of the user system 100, such as rotation or acceleration; user interface actions, such as taps or clicks; or the like. In some embodiments, the usage data 316 or portions thereof may be generated by one or more sensors. For example, movement of the user system 100 can be detected by one or more movement sensors of the user system 100, such as accelerometers or gyroscopes.

In the illustrated example, data items may be evaluated using a set of response validation rules 322 or a machine learning model, such as a challenge context model 324.

In some embodiments, a set of response validation rules 322 includes one or more rules against which one or more items of challenge response metadata 312, environmental data 314, usage data 316, other data items, or some combination thereof are evaluated to validate a genuine human user as providing the challenge response data 300. For example, response validation data 352 may be a flag indicating whether challenge context data 310 satisfies each of one or more response validation criteria. As another example, response validation data 352 may include a set of flags, one for each of a plurality of response validation criteria.

In some embodiments, a challenge context model 324 may be a neural-network-based model or other model configured to evaluate challenge response metadata 312, environmental data 314, usage data 316, other data items, or some combination thereof. For example, response validation data 352 may be classification output generated by the model 324 that has been trained to classify the input data items as indicative of genuine human use in connection with responding to a challenge. As another example, response validation data 352 may be regression output generated by the model 324 that has been trained to produce a score or other value. A higher value may indicate that the input data items are more likely indicative of genuine human use in connection with responding to a challenge.

At decision block 216 of the routine 200, the validation subsystem 130 or some other application, module, or component executed by the user system 100 can determine whether one or more data items associated with response to the challenge satisfy one or more response validation criteria.

In some embodiments, as described above, a set of response validation rules 322 is used to evaluate challenge context data 310. In such embodiments, particular items or combinations of items of challenge context data 310 may be evaluated against each of the response validation rules 322, or some subset thereof.

In one example, a response validation criterion may be a requirement that the timestamp from EXIF metadata for an image correspond to a time that is after the time at which the challenged was prompted. If the timestamp from the EXIF metadata is prior to the time at which the challenge prompt was presented (e.g., as generated by an internal system clock of the user system 100 and recorded in environmental data 314), then the image data or other challenge response data 300 was likely not generated in response to the challenge prompt and the challenge response may fail to satisfy a response validation criterion.

In another example, a response validation criterion may be a requirement that the timestamp from EXIF metadata for an image correspond to a time that is at least a threshold period of time after the time at which the challenged was prompted. If the timestamp from the EXIF metadata does not correspond to a time that is at least the threshold period of time after the time at which the challenge prompt was presented, then the image data or other challenge response data 300 was likely not generated by a genuine human user in response to the challenge prompt (e.g., it was generated too quickly to come from a human and therefore may have been automatically generated by malicious code) and the challenge response may fail to satisfy a response validation criterion.

In another example, a response validation criterion may be a requirement that the timestamp from EXIF metadata for an image correspond to a time that is less than a threshold period of time after the time at which the challenged was prompted. If the timestamp from the EXIF metadata does not correspond to a time that less than the threshold period of time after the time at which the challenge prompt was presented, then the image data or other challenge response data 300 may have been obtained from a third-party and thus was likely not generated by a genuine human user in response to the challenge prompt. The challenge response may therefore fail to satisfy a response validation criterion.

In another example, a response validation criterion may be a requirement that the source of the image data, as represented by user system identification data or camera device identification data from EXIF metadata for an image, correspond to the user system or camera device of the user system on which the human user verification procedure is being executed, as represented by environmental data 314. If the user system identification data or camera device identification data from EXIF metadata for an image fail to correspond to the user system or camera device of the user system on which the human user verification procedure is being executed, then the image data or other challenge response data 300 may have been obtained from a third-party (e.g., the image data was generated by a camera device external to the user system) and thus was likely not generated by a genuine human user in response to the challenge prompt. The challenge response may therefore fail to satisfy a response validation criterion.

In another example, a response validation criterion may be a requirement that the geographic location at which an image was taken (e.g., represented by GPS coordinates from the EXIF metadata for the image) matches or is within a threshold distance of the geographic location of the user system 100 (e.g., represented by GPS coordinates from the user system 100 and recorded in environmental data 314) at the time the human user verification procedure is executed. If the geographic location at which the image was taken does not match or is not within a threshold distance of the geographic location of the user system 100, then the image data or other challenge response data 300 may have been obtained from a third-party and thus was likely not generated by a genuine human user in response to the challenge prompt. The challenge response may therefore fail to satisfy a response validation criterion.

In another example, a response validation criterion may be a requirement that the user system 100 be moved in a manner that corresponds to genuine human use of the user system 100 to capture an image or otherwise respond to the challenge prompt. Usage data 316 may represent movements of the user system 100, such as acceleration, rotation, etc. If the movements of the user system 100 are not indicative of genuine human use of the user system 100 to respond to the challenge prompt (e.g., as represented by a model of genuine human use, such as challenge context model 324), then the image data or other challenge response data 300 may have been obtained from file or a third-party and thus was likely not generated by a genuine human user in response to the challenge prompt. The challenge response may therefore fail to satisfy a response validation criterion.

In some embodiments, challenge context data 310 is evaluated using a model 324, as described above. In such embodiments, the response validation data 352 may be a classification output or a regression value indicative of whether the input data items are likely indicative of genuine human use in connection with responding to a challenge.

The example data items, machine learning models, and output shown in FIG. 3 and described herein are illustrative only, and are not intended to be limiting, required, or exhaustive. In some embodiments, additional, fewer, or alternative data items or methods of evaluation may be used.

If the challenge context data associated with the challenge response satisfies the one or more response validation criteria, the routine 200 may proceed to block 218 to indicate that the user has passed the human user verification procedure, or the routine 200 may proceed to block 210 (as illustrated using dashed lines) for evaluation of the challenge response if block 210 was not completed previously or in parallel. Otherwise, if the challenge context data associated with the challenge response fails to satisfy one or more response validation criteria, the routine 200 may proceed to block 220 to indicate that the human user verification procedure has failed to verify a genuine human user.

At block 218, the application 110 or some other application, module, or component executed by the user system 100 can determine that the user has passed the human user verification procedure. The determination may be based on output of the input analysis subsystem 120 or the validation subsystem 130. For example, if the input analysis subsystem 120 has determined that the challenge response data matches the challenge subject or otherwise satisfies the challenge prompt, and the if the validation subsystem 130 determines that various data items associated with the challenge satisfy one or more validation criteria, then the application 110 may determine that the user has passed the human user verification procedure. In response, human user verification data may be generated as output to indicate successful completion, by the user, of the human user verification procedure. In some embodiments, an indicator of success may be presented to the user, the application 110 may proceed with functionality or content that required verification of a genuine human user, or a notification may be provided to a remote system. Advantageously, the challenge, response processing, and determination of whether the user has passed the human user verification procedure may be performed entirely on the user system 100 to mitigate or avoid security risks such as the risk of a man-in-the-middle attack.

At block 220, the application 110 or some other application, module, or component executed by the user system 100 can determine that the user has failed the human user verification procedure. The determination may be based on output of the input analysis subsystem 120 or the validation subsystem 130. For example, if the input analysis subsystem 120 has determined that the challenge response data does not match the challenge subject or otherwise does not satisfy the challenge prompt, then the application 110 may determine that the user has failed the human user verification procedure. As another example, if the validation subsystem 130 determines that various data items associated with the challenge fail to satisfy one or more validation criteria, then the application 110 may determine that the user has failed the human user verification procedure. In response to a determination that the user has failed the human user verification procedure, human user verification data may be generated as output to indicate the failure. In some embodiments, an indicator of failure may be presented to the user, the application 110 may not proceed with functionality or content that required verification of a genuine human user, or a notification may be provided to a remote system.

In some embodiments, evaluation of the challenge response, evaluation of the challenge context data, or both may be used for purposes in addition to, or as an alternative to, preventing access to content or otherwise preventing performance of an operation. For example, if evaluation of the challenge response, challenge context data, or both indicates the challenge response is unlikely to have been generated by a genuine human user, then subsequent data provided by the user may be flagged as questionable or not flagged as verified. As another example, alternative information may be presented, such as false information to deceive or affect the performance of an automatic system that has generated the challenge response. These and other examples are shown in FIG. 4B and described in greater detail below.

Although the blocks of FIG. 2 and the description of the routine 200 above proceed in a particular sequence, the illustration and description are for purposes of example only and are not intended to be limiting, required, or exhaustive.

In some embodiments, certain blocks of the routine 200 may proceed in parallel, asynchronously, or in a different sequence than described herein. For example, the routine 200 may proceed to block 210 through decision block 212 prior to beginning block 214. As another example, the routine 200 may proceed to block 214 through decision block 216 prior to beginning block 210. As a further example, blocks 210 and 214 may be executed in parallel or otherwise asynchronously. In some embodiments, the routine 200 may not include the operations of blocks 214 and 216.

EXAMPLE EMBODIMENTS

Figure 4A:
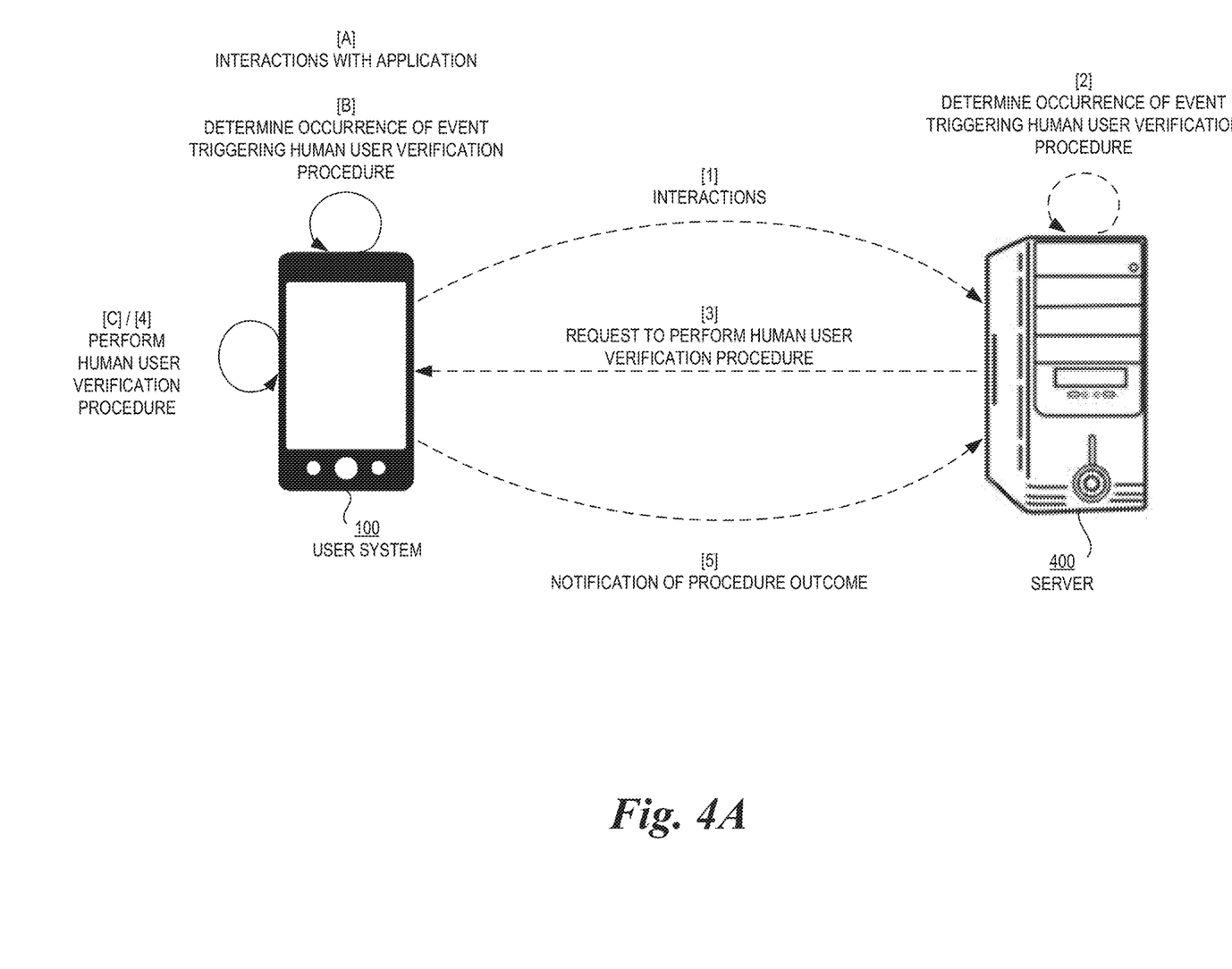
FIG. 4A is a diagram of illustrative data flows and interactions between a user system and a network-accessible computing system according to some embodiments.
Figure 4B:
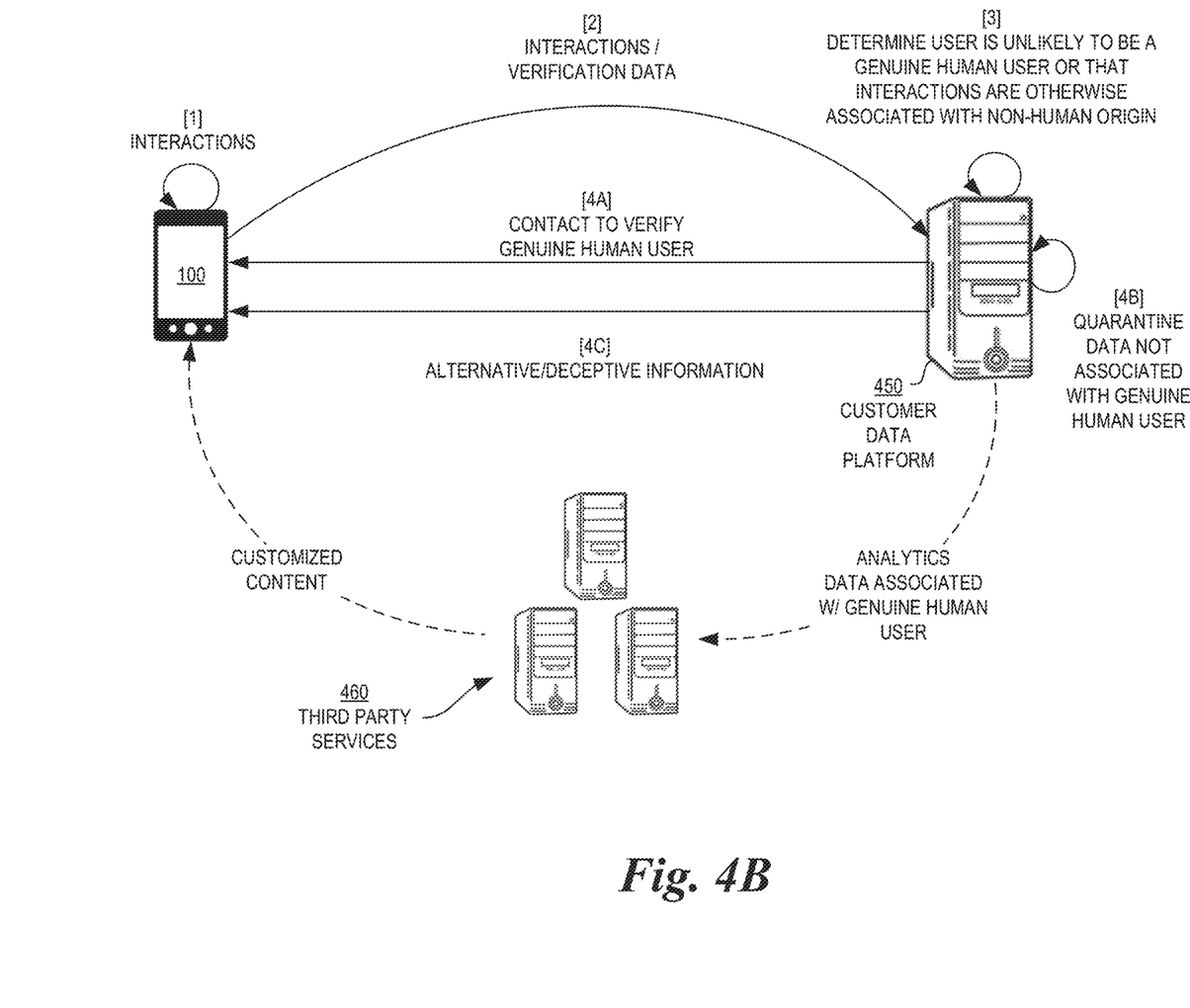
FIG. 4B is a diagram of illustrative data flows and interactions between a user system, a network-accessible computing system, and a third-party system according to some embodiments.

FIG. 4A illustrates various example embodiments of how a human user verification procedure may be triggered.

In one embodiment, a user may be interacting with the application 110 running on the user system 100 at [A]. For example, the user may be tapping/clicking on user interface controls, entering text, scrolling, etc. of the user system 100. The interaction may be with local content (e.g., content stored on the user system 100 or generated by the application 110). At [B], the user may perform an action that triggers initiation of—or the application 110 may otherwise determine to initiate—a human user verification procedure. For example, the user may initiate purchase of an item. As another example, the application 110 may evaluate data regarding user interactions and determine that the user may possibly not be a genuine human user and instead be computer operated without human input. At [C], the application 110 or some other module or component of the user system 100 may trigger performance of a human user verification procedure. The human user verification procedure may proceed as described above.

In one embodiment, a user may be interacting with a network-accessible computing system, such as a server computing device 400 (also referred to simply as a "server"), at [1]. For example, the user may be using an application 110 running on the user system 100 to request, retrieve, and interact with content from the server computing device 400 (e.g., content received from a server of a content provider, online marketplace, or some other third-party service), submit information to the server computing device 400, etc. At [2], the server computing device 400 may determine that an event has occurred to trigger initiation of a human user verification procedure. For example, the user may initiate purchase of an item from an online marketplace hosted by the server computing device 400. As another example, the server computing device 400 may evaluate data regarding user interactions and determine that the user of the user system 100 may possibly not be a genuine human user and instead be computer operated without human input. At [3], the server can send a notification to the application 110 to initiate the human user verification procedure. At [4], the application 110 or some other module or component of the user system 100 may trigger performance of a human user verification procedure. The human user verification procedure may proceed as described above. In some embodiments, a notification of the result of the human user verification procedure may be provided to the server computing device 400 at [5]. In other embodiments, a notification of the result of the human user verification procedure may not be provided to the server computing device 400.

Evaluation of a challenge response, evaluation of challenge context data, or both may be used for purposes in addition to, or as an alternative to, preventing access to content or otherwise preventing performance of an operation. In some embodiments, data determined to potentially be associated with a non-human origin may be separated (e.g., quarantined) from data more likely to be associated with a human origin. For example, a customer data platform 450 may be configured to generate analytics data regarding interactions with the application 110. The analytics data may be provided to third-party services 460 for use in, e.g., generating customized or targeted content such as advertisements. If a user is determined (e.g., by server 400 in communication with a customer data platform 450, by a server 400 that is part of a customer data platform 450, or by customer data platform 450 on its own) unlikely to be a genuine human user based on evaluation of a challenge response, challenge context data, or both, then the customer data platform 450 may quarantine interaction data, analytics data, or other data associated with the non-human origin. The data may therefore not be communicated (e.g., not sent to a third-party service 460) or may not undergo processing that may be performed for interaction data, analytics data, or other data associated with the human origin. This quarantine can reduce the computing resources used for—or reduce the overall cost of—processing data associated with a non-human origin, which may be deemed to be of limited or no value and thus merit limited or no processing. In addition, the quarantine of such data can lead to suppression of content that would otherwise have been served to the non-genuine human user (e.g., by a third-party service 460), thereby facilitating serving of the content to a human user but not the non-genuine human user. The data collected by the quarantine may be useful for training or configuration purposes so that, for instance, the customer data platform 450 may be better able to identify activity indicative of non-genuine human user or may adjust configuration settings for the application 110 to increase the difficultly for the non-genuine human user in succeeding in the human user verification procedure.

In some embodiments, behavior suspected to be of non-human origin may be flagged by the customer data platform 450, and a supplemental verification procedure may be initiated to verify whether the user is a genuine human user. For example, if the server 400, application 110, customer data platform 450, or some other entity determines that a user is unlikely to be a genuine human user based on evaluation of the challenge response, then a contact center agent may be notified to follow up with the purported end user to verify whether the user is a genuine human user. Different actions may be taken depending upon the result of the follow up contact. For example, the customer data platform 450 may or may not process data or events associated with the user, or may or may not quarantine the data or events, or the like.

In some embodiments, in response to behavior suspected to be of non-human origin, the customer data platform 450 or third-party service 460 may send alternative information to the user system 100, or the application 110 may present alternative information. For example, if a user is determined unlikely to be a genuine human user based on evaluation of the challenge response, then the customer data platform 450, third-party service 460, or application 110 may generate information to deceive or affect the performance of an automatic system that may have generated the challenge response. The information may be randomly generated data, stale data (e.g., data which is outdated or inaccurate because it has not been updated to reflect the latest changes or developments), accurate but incomplete data (e.g., data which includes a portion of a requested data but not the entirety of the requested data), or data responsive to a query other than a query presented by the non-genuine human user. Such generation of the information may prevent the non-genuine human user from accessing information that would have been otherwise accessible to a genuine human user.

FIG. 4B illustrates various example embodiments of how data determined to potentially be associated with a non-human origin may be handled. As shown, at [1] a user may interact with an application 110 running on the user system 100. The interactions may be with local content (e.g., content stored on the user system 100 or generated locally by the application) or remote content (e.g., content obtained from a network server, such as a server of a third-party service 460). In some embodiments, the interactions may trigger initiation of—or the application 110 may otherwise determine to initiate—a human user verification procedure. The human user verification procedure may proceed as described above. For example, verification data representing results of the human user verification procedure may be sent to a customer data platform 450 at [2]. In some embodiments, data regarding the user interactions may be sent to the customer data platform 450 at [2]. The customer data platform 450 may then manage a human user verification procedure (e.g., in combination with application 110) to determine whether the user is a genuine human user.

The customer data platform 450 may determine at [3] that the user is unlikely to be a genuine human user, or determine that the interactions associated with the user system 100 are otherwise associated with a non-human origin. For example, the customer data platform 450 may receive verification data from the user system 100 indicating that the user has failed a human user verification procedure. As another example, customer data platform 450 may perform a human user verification procedure and determine that the user has failed.

Based on determining that the user is unlikely to be a genuine human user or that the interactions associated with the user system 100 are otherwise associated with a non-human origin, the customer data platform 450 may perform one or more functions. In some embodiments, at [4A] the customer data platform 450 may contact the user system 100 to attempt to verify whether the user is a genuine human user. For example, behavior suspected to be of non-human origin could be flagged by the customer data platform 450, and a notification may be generated (e.g., shared via an API integration) for a contact center agent. In response, a contact center agent may follow up with the supposed end-user, and perform an additional human user verification procedure to attempt to verify whether the user is a genuine human user. The end-user could also be informed in real-time (e.g., while they are still interacting with a service) that there has been a problem (e.g., a problem with an order or submission).

In some embodiments, at [4B] data determined to potentially be associated with a non-human origin may be separated (e.g., quarantined) from data more likely to be associated with a human origin. For example, the customer data platform 450 may be configured to generate analytics data regarding interactions with the application 110. The analytics data may be provided to third-party services 460 for use in, e.g., generating customized or targeted content such as advertisements. If the customer data platform 450 (or some other entity) determines that a user is unlikely to be a genuine human user based on evaluation of the challenge response, challenge context data, or both, then the customer data platform 450 may quarantine interaction data, analytics data, or other data associated with the non-human origin. The quarantine can reduce the computing resources (and overall cost) required by the third-party services 460 or customer data platform 450 for processing data associated with non-human origins. In addition, or alternatively, the quarantine of such data can lead to suppression of content that would otherwise have been served to the non-human user (e.g., from the third-party services 460).

In some embodiments, at [4C] the customer data platform 450 may send alternative or deceptive information to the user system 100. For example, the customer data platform 450 may generate data using a pseudo-random number generator (PRNG) to generate fake data. As another example, the customer data platform 450 may select data previously generated to interfere with the operation of a suspected automatic system or other non-human origin of data, interactions, or events. Alternatively, or in addition, the application 110 may generate and present such alternative or deceptive information.

One or more of the features, devices, servers, or systems described herein can be combined with or performed along with one or more of the features, devices, servers, or systems described in U.S. Pat. No. 8,805,946, titled "SYSTEM AND METHOD FOR COMBINING CONTENT SITE VISITOR PROFILES," U.S. Pat. No. 8,843,827, titled "ACTIVATION OF DORMANT FEATURES IN NATIVE APPLICATIONS," U.S. Pat. No. 9,363,311, titled "DELIVERY OF INSTRUCTIONS IN HOST APPLICATIONS," U.S. Pat. No. 9,807,184, titled "CONFIGURATION OF CONTENT SITE USER INTERACTION MONITORING IN DATA NETWORKS," and U.S. Pat. No. 10,327,018, titled "ENGAGEMENT TRACKING IN COMPUTER DATA NETWORKS." The disclosures of the foregoing patents are hereby incorporated by reference in their entirety and made part of this specification.

Execution Environment

Figure 5:
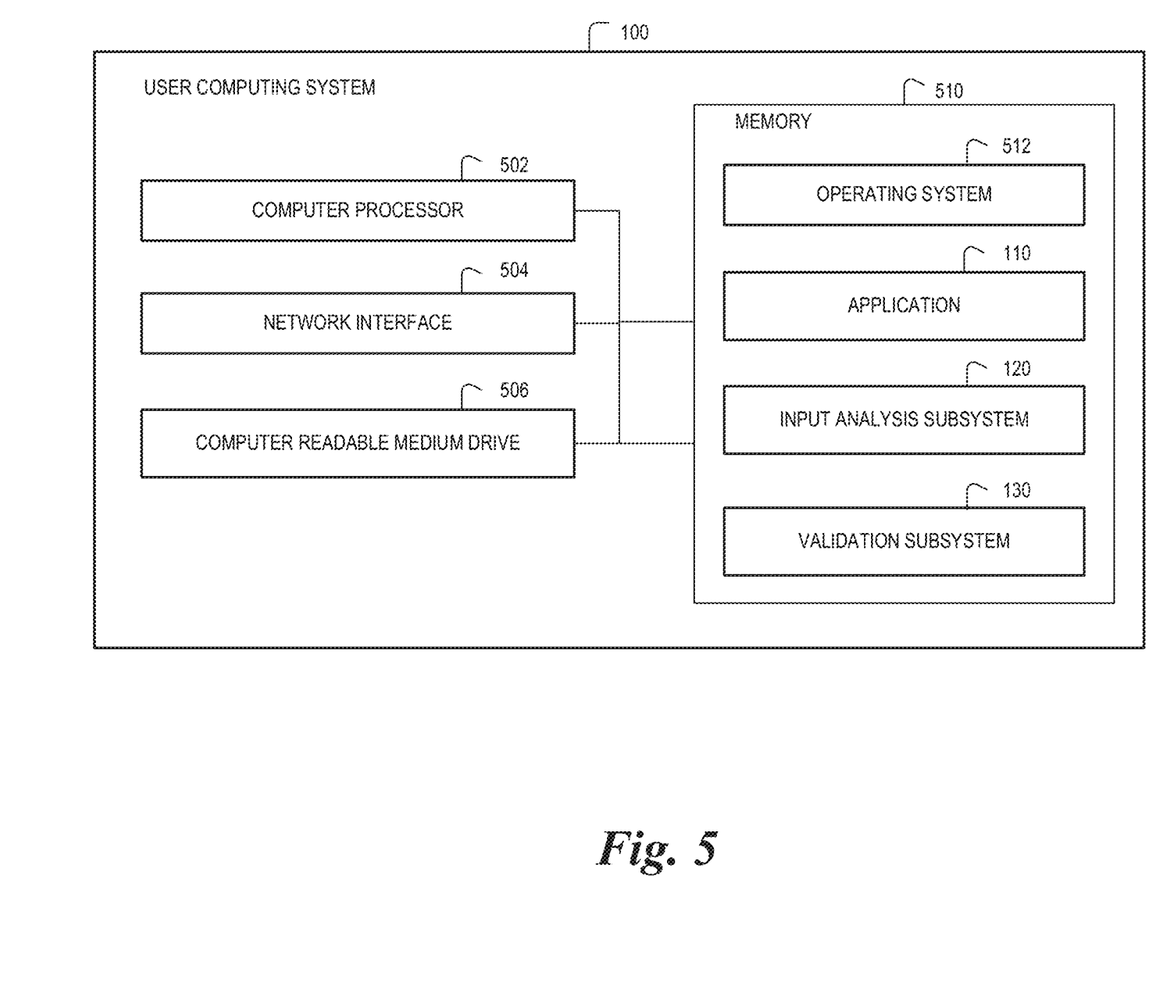
FIG. 5 is a block diagram of an illustrative user system configured to implement aspects of the present disclosure according to some embodiments.

FIG. 5 illustrates various components of an example user system 100 configured to implement various functionality described herein. The user system 100 may be a physical computing device, such as a laptop computing device, tablet computing device, smart phone, smart eyewear, or some other computing system.

In some embodiments, as shown, a user system 100 may include: one or more computer processors 502, such as physical central processing units (CPUs); one or more network interfaces 504, such as a network interface cards (NICs); one or more computer readable medium drives 506, such as a high density disk (HDDs), solid state drives (SSDs), flash drives, or other persistent non-transitory physical computer storage; and one or more computer-readable memories 510, such as random access memory (RAM) or other volatile non-transitory computer readable media.

The computer-readable memory 510 may include computer program instructions that one or more computer processors 502 execute or data that the one or more computer processors 502 use in order to implement one or more embodiments. For example, the computer-readable memory 510 can store an operating system 512 to provide general administration of the user system 100. As another example, the computer-readable memory 510 can store an application 110 comprising executable instructions. As another example, the computer-readable memory 510 can store an input analysis subsystem 120 comprising executable instructions or a model. As another example, the computer-readable memory 510 can store a validation subsystem 130 comprising executable instructions or one or more models.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computing system comprising:
   a display device;
   a camera device configured to generate image data;
   computer-readable memory storing an image recognition model configured to recognize images of a plurality of challenge subjects; and
   one or more processors programmed by executable instructions to at least:

determine to verify whether a user, of an application configured to be executed by the one or more processors, is a human user;
select a challenge subject from the plurality of challenge subjects, wherein an image of the challenge subject is to be provided in response to a challenge prompt;
present the challenge prompt using the display device;
receive, in response to the challenge prompt, the image data and challenge context data;
determine, using the image recognition model, that at least a portion of the image data represents the image;
determine that the challenge context data fails to satisfy a response validation criterion based on determining that the challenge context data indicates the image data was generated using another camera device different from the camera device, wherein the challenge context data represents a source of the image data; and
in response to determining that the challenge context data fails to satisfy the response validation criterion, prevent an operation of the application.

2. The computing system of claim 1, wherein the image recognition model comprises a neural network trained to recognize the plurality of challenge subjects.

3. The computing system of claim 1, wherein the plurality of challenge subjects comprise objects expected to be within an environment of the user.

4. The computing system of claim 1, wherein the image data and challenge context data are not transmitted to a second computing system.

5. The computing system of claim 1, further comprising a movement sensor, wherein to determine that the challenge context data fails to satisfy the response validation criterion, the one or more processors are programmed by the executable instructions to determine that movement detected by the movement sensor is not indicative of human use of the camera device to generate the image data, wherein the challenge context data represents the movement detected by the movement sensor.

6. The computing system of claim 1, wherein to determine that the challenge context data fails to satisfy the response validation criterion, the one or more processors are programmed by the executable instructions to determine that the image data was generated at a first geographic location different from a second geographic location, wherein the challenge context data represents the first geographic location.

7. The computing system of claim 1, wherein to determine that the challenge context data fails to satisfy the response validation criterion, the one or more processors are programmed by the executable instructions to determine that the image data was generated prior to presentation of the challenge prompt, wherein the challenge context data represents a time at which the image data was generated.

8. The computing system of claim 1, wherein to determine that the challenge context data fails to satisfy the response validation criterion, the one or more processors are programmed by the executable instructions to determine that the image data was generated less than a threshold period of time after presentation of the challenge prompt, wherein the challenge context data represents a time at which the image data was generated.

9. The computing system of claim 1, wherein to determine that the challenge context data fails to satisfy the response validation criterion, the one or more processors are programmed by the executable instructions to determine that the image data was generated more than a threshold period of time after presentation of the challenge prompt, wherein the challenge context data represents a time at which the image data was generated.

10. A computer-implemented method comprising:
under control of a computing system comprising one or more processors configured to execute specific instructions:
determining that a human user verification procedure is to be performed;
selecting a challenge subject from a plurality of challenge subjects, wherein an image of the challenge subject is to be provided in response to a challenge prompt;
presenting the challenge prompt using a display device of the computing system;
receiving, in response to the challenge prompt, image data and challenge context data;
generating subject verification data representing whether the image data comprises a representation of the image;
generating response validation data representing whether the challenge context data satisfies a response validation criterion based on determining that the image data was generated prior to presentation of the challenge prompt, wherein the challenge context data represents a time at which the image data was generated; and
generating human user verification data based at least partly on the subject verification data and the response validation data.

11. The computer-implemented method of claim 10, wherein determining that the human user verification procedure is to be performed is based on a request received from a server computing device over a network, and wherein neither the image data nor the challenge context data are transmitted by the computing system to the server computing device.

12. The computer-implemented method of claim 10, further comprising determining that the challenge context data fails to satisfy the response validation criterion, wherein the human user verification data represents a failure to verify that a human user responded to the challenge prompt.

13. The computer-implemented method of claim 12, wherein determining that the challenge context data fails to satisfy the response validation criterion comprises determining that the image data was generated using a camera device external to the computing system, and wherein the challenge context data represents a source of the image data.

14. The computer-implemented method of claim 12, wherein determining that the challenge context data fails to satisfy the response validation criterion comprises determining that movement of the computing system is not indicative of human use of a camera device of the computing system to generate the image data, wherein the challenge context data represents movement of the computing system.

15. The computer-implemented method of claim 12, wherein determining that the challenge context data fails to satisfy the response validation criterion comprises determining that the image data was generated at first geographic location different from a second geographic location, wherein the challenge context data represents the first geographic location.

16. The computer-implemented method of claim 12, wherein determining that the challenge context data fails to satisfy the response validation criterion comprises determining that the image data was generated less than a threshold period of time after presentation of the challenge prompt, wherein the challenge context data represents a time at which the image data was generated.

17. The computer-implemented method of claim 12, further comprising, in response to determining that the challenge context data fails to satisfy the response validation criterion, quarantining data associated with a non-genuine human user.

18. The computer-implemented method of claim 12, further comprising, in response to determining that the challenge context data fails to satisfy the response validation criterion, generating alternative data for presentation to a non-genuine human user.

* * * * *